(12) United States Patent
Jeon et al.

(10) Patent No.: US 8,660,087 B2
(45) Date of Patent: Feb. 25, 2014

(54) APPARATUS AND METHOD FOR HANDOVER IN BROADBAND WIRELESS COMMUNICATION SYSTEM FOR SUPPORTING MOBILE RELAY STATION

(75) Inventors: Young-Hyun Jeon, Gyeonggi-do (KR); Jong-Hyung Kwun, Gyeonggi-do (KR); Yung-Soo Kim, Gyeonggi-do (KR); Chan-Ho Min, Seoul (KR)

(73) Assignee: Samsung Electronics Co., Ltd (KR)

(*) Notice: Subject to any disclaimer, the term of this patent is extended or adjusted under 35 U.S.C. 154(b) by 316 days.

(21) Appl. No.: 13/057,099

(22) PCT Filed: Jul. 28, 2009

(86) PCT No.: PCT/KR2009/004190
§ 371 (c)(1),
(2), (4) Date: Feb. 1, 2011

(87) PCT Pub. No.: WO2010/016676
PCT Pub. Date: Feb. 11, 2010

(65) Prior Publication Data
US 2011/0134887 A1    Jun. 9, 2011

(30) Foreign Application Priority Data
Aug. 5, 2008  (KR) .................. 10-2008-0076397

(51) Int. Cl.
*H04Q 7/00* (2006.01)
*H04Q 7/20* (2006.01)

(52) U.S. Cl.
USPC .......................................... 370/331; 455/436

(58) Field of Classification Search
USPC ................................ 370/310–350; 455/7–453
See application file for complete search history.

(56) References Cited

U.S. PATENT DOCUMENTS 7,729,373 B2*  6/2010  Dale et al. ............ 370/462
2005/0192011 A1*  9/2005  Hong et al. ........... 455/440
(Continued)

FOREIGN PATENT DOCUMENTS

| WO | WO 2007046630 | 4/2007 | |
|---|---|---|---|
| WO | WO2007078138 | * 7/2007 | ............ H04L 1/00 |

OTHER PUBLICATIONS

PCT/ISA/237 Written Opinion issued on PCT/KR2009/004190 (3 pp.).

*Primary Examiner* — Un C Cho
*Assistant Examiner* — Fangyan Deng
(74) *Attorney, Agent, or Firm* — The Farrell Law Firm, P.C.

(57) ABSTRACT

An apparatus and a method for handover in a broadband wireless communication system supporting a Mobile Relay Station (MRS) are provided. The method includes transmitting a Connection ID (CID) of Mobile Stations (MSs), the CIDs pre-allocated by a target BS, to the MSs; sending a resource allocation message comprising uplink resource allocation information for bandwidth request of the MSs, to the MSs; receiving a bandwidth request message which comprises security authentication information of each MS, from the MSs using an uplink resource allocated through the uplink resource allocation information; and aggregating bandwidth request messages of the MSs and sending a ranging request message comprising the security authentication information and bandwidth request information of the MSs to the target BS. Thus, the handover delay time, which is inevitable for the bandwidth request in the conventional connection set-up procedure, can be reduced, and the handover with the reliability guaranteed can be achieved by allowing the security related processing in the network re-entry procedure.

13 Claims, 7 Drawing Sheets

(56) References Cited

U.S. PATENT DOCUMENTS

| | | |
|---|---|---|
| 2007/0086387 A1 | 4/2007 | Kang et al. |
| 2007/0104148 A1 | 5/2007 | Kang et al. |
| 2007/0249347 A1* | 10/2007 | Saifullah et al. ............. 455/436 |
| 2008/0056193 A1* | 3/2008 | Bourlas et al. ................ 370/331 |
| 2008/0090585 A1* | 4/2008 | Hart et al. .................... 455/453 |
| 2008/0108303 A1* | 5/2008 | Okuda ............................. 455/7 |
| 2008/0220716 A1* | 9/2008 | Tsai et al. ........................ 455/7 |
| 2008/0291847 A1* | 11/2008 | Zheng ........................... 370/255 |
| 2009/0061922 A1* | 3/2009 | Ergen et al. .................. 455/525 |
| 2009/0168722 A1* | 7/2009 | Saifullah et al. ............. 370/331 |
| 2009/0221288 A1* | 9/2009 | Zhang et al. ................. 455/434 |

* cited by examiner

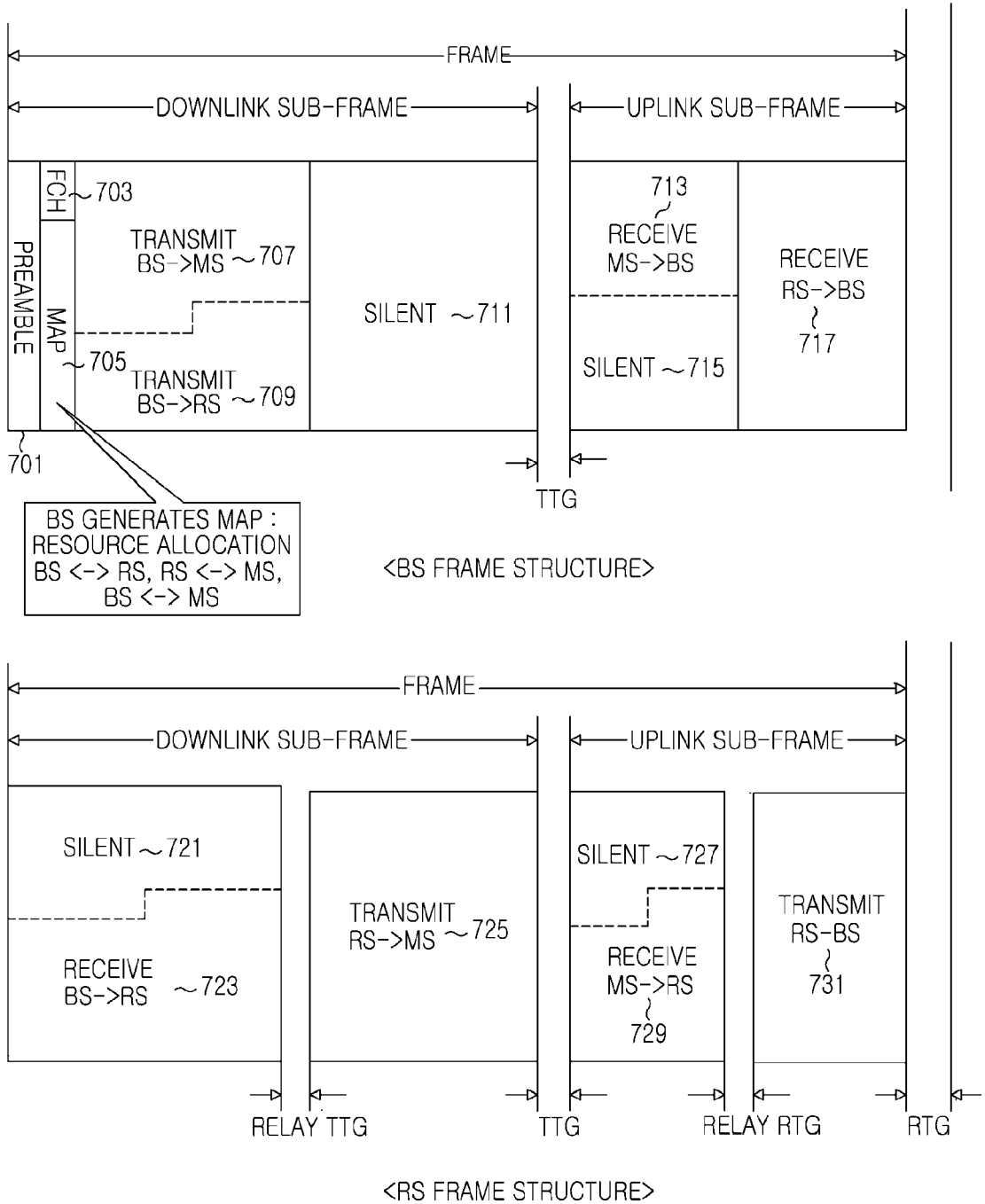

APPARATUS AND METHOD FOR HANDOVER IN BROADBAND WIRELESS COMMUNICATION SYSTEM FOR SUPPORTING MOBILE RELAY STATION

TECHNICAL FIELD

The present invention relates generally to an apparatus and a method for handover of a broadband wireless communication system for supporting a mobile relay station. More particularly, the present invention relates to an apparatus and a method for, when a mobile relay station installed in a fast moving vehicle intends to perform handover to a target base station in place of its subordinate mobile stations, reducing a handover delay time necessarily caused for a bandwidth request in a connection set-up procedure of a conventional handover execution or action procedure by pre-allocating a Connection IDentifier (CID) to the plurality of the mobile stations at the target base station in a handover preparation procedure before the handover execution or action procedure, and for supporting the handover with reliability guaranteed by enabling a security related processing in a network re-entry procedure of the handover execution or action procedure.

BACKGROUND ART 802. 16j standard is considering an object called fixed relay station in addition to a base station and a mobile station of a Mobile Wimax system of the conventional 802. 16e standard, and advancing to expand a cell service coverage and to increase a system capacity using the fixed relay station. One of conditions suggested by International Telecommunication Union Radio communication Sector (ITU-R) as requirements of a candidate technology of International Mobile Telecommunication (IMT)-Advanced, is to provide the seamless handover to mobile stations moving fast at 120~350 km. For the seamless and highly reliable communications of the mobile stations; that is, to support the mobility, the 802. 16j standard suggests and reflects a technique which reduces the handover delay in a manner that a mobile relay station is authorized by the mobile stations communicating with a serving base station to perform the handover to a target base station. According to this technique, the mobile relay station installed in a fast moving vehicle (e.g., bus or train) performs the handover in lieu of the mobile stations in the fast moving vehicle, and thus provides the seamless and highly reliable service to the mobile stations. Since the relay station can relatively freely adopt a multi-antenna technology compared to the mobile station even in the fast movement under severe fading, it is highly likely to overcome the fading. In terms of the power constraint, this technique is based on the hardware feature of the higher degree of freedom than the mobile station.

In the handover scheme of the mobile relay station of the 802. 16j standard, the mobile stations subordinate to the mobile relay station do not perform the handover and blindly operate using a CID mapping. That is, in the downlink, the target base station transmits a new CID of the mobile station, an old CID mapped to the new CID before the handover, and data destined for mobile station, to the mobile relay station. The mobile relay station forwards the data to the mobile station by changing the new CID of the MAC PDU destined for the mobile station with the old CID mapped to the new CID. In the uplink, the mobile relay station forwards data to the target base station by changing the old CID of the MAC PDU sent from the mobile station with the new CID mapped to the old CID. Accordingly, the mobile stations subordinate to the mobile relay station do not need to update the CID and can omit a security related procedure between the mobile station and the target base station. As such, as for the handover scheme of the mobile relay station in the 802. 16j standard, the mobile relay station represents its subordinate mobile stations, minimizes the message exchanges between the mobile stations and the mobile relay station, and carries out the handover through a first stage (the base station <--> the mobile relay station) message exchange between the mobile relay station and the base station, to thus minimize the handover delay.

A handover process in 802. 16 systems based on the Mobile Wimax is divided largely into a handover preparation procedure and a handover execution or action procedure. The handover execution or action procedure largely includes a synchronization acquisition procedure, a network re-entry procedure, and a connection set-up procedure. The handover scheme of the mobile relay station in the 802. 16j standard overlooks two important problems: one is the vulnerability in the security and the other is the residual handover delay according to the bandwidth request executed in the connection set-up procedure.

First, the security related problem is discussed. Basically, the handover standardization of the mobile Wimax based on the 802. 16e is considering the security related processing of the network re-entry procedure as the important requirement. This is because, in the handover, the security related processing at the level of the authorization of the mobile relay station is quite important in the malicious eavesdropping prevention and the e-mobile commercial business transaction processing. Hence, even a user boarding the fast moving vehicle is not exceptional in the security. However, in the handover of the 802. 16j system, the mobile stations subordinate to the mobile relay station do not need to update the CID and thus do not conduct the authentication procedure using Cipher-based Message Authentication Code (CMAC) of the base station. In conclusion, the handover of the 802. 16j system can minimize the handover delay using the CID mapping but is seriously vulnerable to the security related attack in the handover execution.

Next, the problem related to the bandwidth request of the connection set-up procedure is discussed. As stated above, the 802. 16j standard asserts that the handover is carried out through the handover related signaling of the first stage (the base station <--> the mobile relay station) between the mobile relay station and the base station and thus the handover delay time is minimized. However, for the mobile station to request the uplink resource allocation and to transmit an initial uplink packet to the target base station via the mobile relay station, the bandwidth request is inevitable. For the bandwidth request, a second stage (the base station <--> the relay station <--> the mobile station) handover related signaling is generated in the connection set-up procedure. That is, there still remains the handover delay time according to the connection set-up time. Evaluation Methodology Document (EMD) of the 802. 16m defines that the handover delay is the sum of the three procedures as mentioned above; that is, the sum of the time delays of the synchronization acquisition procedure, the network re-entry procedure, and the connection set-up procedure.

In short, the handover scheme of the mobile relay station according to the current 802. 16j standard does not take into account not only the security problem but also the connection set-up procedure including the bandwidth request. There is the trade-off between the handover delay problem which should stick to the first stage signaling and the security problem which should stick to the second stage signaling. Thus, what is needed is a method for minimizing the handover delay as in the 802.16j handover scheme and for addressing the conflict with the security problem.

DISCLOSURE OF INVENTION

Solution to Problem

An aspect of the present invention is to address at least the above mentioned problems and/or disadvantages and to provide at least the advantages described below. Accordingly, an aspect of the present invention is to provide an apparatus and a method for handover in a broadband wireless communication system supporting a mobile relay station.

Another aspect of the present invention is to provide an apparatus and a method for, when a mobile relay station installed to a fast moving vehicle intends to perform handover to a target base station in place of its subordinate mobile stations in a broadband wireless communication system, reducing a handover delay time necessarily caused for a bandwidth request in a connection set-up procedure of a conventional handover execution or action procedure by pre-allocating a Connection IDentifier (CID) to the plurality of the mobile stations at the target base station in a handover preparation procedure before a handover execution or action procedure, and for supporting the handover with reliability guaranteed by enabling a security related processing in a network re-entry procedure of the handover execution or action procedure.

Yet another aspect of the present invention is to provide an apparatus and a method for, when a mobile relay station performs handover in place of its subordinate mobile stations in a broadband wireless communication system, pre-allocating a CID to be used by a target base station after the handover to the mobile stations, to the mobile stations through a backhaul message exchange between a serving base station and the target base station in a handover preparation procedure.

Still another aspect of the present invention is to provide an apparatus and a method for, when a mobile relay station performs handover in place of its subordinate mobile stations in a broadband wireless communication system, transmitting uplink resource allocation information for bandwidth request to the mobile stations in the downlink of a frame carrying a handover indication message from the mobile relay station to a serving base station.

A further aspect of the present invention is to provide an apparatus and a method for, when a mobile relay station performs handover in place of its subordinate mobile stations in a broadband wireless communication system, transmitting a ranging response message including uplink resource allocation information for a target base station to send a subsequent ranging request message and uplink resource allocation information for the bandwidth request of the mobile stations, in response to a ranging code transmitted from the mobile relay station to the target base station.

A further aspect of the present invention is to provide an apparatus and a method for, when a mobile relay station performs handover in place of its subordinate mobile stations in a broadband wireless communication system, transmitting a bandwidth request message including information required for security authentication of the mobile stations in a handover execution or action procedure, to the mobile relay station using a CID pre-allocated by the target base station in a handover preparation procedure, herein, the bandwidth request message is transmitted before a network re-entry procedure of the target base station and the mobile relay station, and allowing the mobile relay station to simultaneously process the security authentication and the bandwidth request of the mobile stations in the handover execution or action procedure.

According to one aspect of the present invention, a method for performing handover at a Mobile Relay Station (MRS) in place of Mobile Stations (MSs) in a wireless communication system includes transmitting a Connection ID (CID) of the MSs, the CIDs pre-allocated by a target BS, to the MSs; sending a resource allocation message comprising uplink resource allocation information for bandwidth request of the MSs, to the MSs; receiving a bandwidth request message which comprises security authentication information of each MS, from the MSs using an uplink resource allocated through the uplink resource allocation information; and aggregating bandwidth request messages of the MSs and sending a ranging request message comprising the security authentication information and bandwidth request information of the MSs to the target BS.

According to another aspect of the present invention, an operating method of an MS when an MRS performs handover in place of the MS in a wireless communication system includes receiving a handover response message comprising a CID of the MS pre-allocated by a target Base Station (BS), from the MRS; receiving a resource allocation message comprising uplink resource allocation information for bandwidth request of the MS, from the MRS; and sending a bandwidth request message comprising security authentication information of the MS to the MRS using an uplink resource allocated through the uplink resource allocation information.

According to yet another aspect of the present invention, a method for a target BS to support handover when an MRS performs the handover in place of MSs in a wireless communication system includes pre-allocating a CID to the MSs when a handover request message is received from a serving BS of the MRS; sending a handover response message comprising the pre-allocated CID of the MSs to the serving BS; receiving a HO ranging code message comprising a ranging code from the MRS; sending a ranging response message comprising uplink resource allocation information for transmitting a subsequent ranging request message, to the MRS; and receiving a ranging request message comprising security authentication information and bandwidth request information of the MSs, from the MRS.

According to still another aspect of the present invention, an apparatus for supporting handover when an MRS performs handover in place of MSs in a wireless communication system includes the MRS for transmitting a CID of the MSs, the CIDs pre-allocated by a target BS, to the MSs, sending a resource allocation message comprising uplink resource allocation information for bandwidth request of the MSs, to the MSs, when receiving a bandwidth request message which comprises security authentication information of each MS, from the MSs, aggregating bandwidth request messages of the MSs, and sending a ranging request message comprising the security authentication information and bandwidth request information of the MSs to the target BS; and the MS for receiving a handover response message comprising the CID of the MS pre-allocated by the target BS, from the MRS, when receiving a resource allocation message comprising uplink resource allocation information for bandwidth request of the MS, and sending a bandwidth request message comprising security authentication information of the MS to the MRS using an uplink resource allocated through the uplink resource allocation information.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF DRAWINGS

The above and other aspects, features and advantages of certain exemplary embodiments the present invention will become more apparent from the following detailed description taken in conjunction with the accompanying drawings, in which:

FIG. 7 is a diagram of frame structures of the base station and the mobile relay station in the broadband wireless communication system which offers a relay service of the mobile relay station to the mobile station in the transparent mode according to another exemplary embodiment of the present invention.

Throughout the drawings, like reference numerals will be understood to refer to like parts, components and structures.

BEST MODE FOR CARRYING OUT THE INVENTION

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Exemplary embodiments of the present invention provide a method for, when a mobile relay station installed to a fast moving vehicle intends to perform handover to a target base station in place of its subordinate mobile stations in a broadband wireless communication system, reducing a handover delay time necessarily caused for a bandwidth request in a connection set-up procedure of a conventional handover execution or action procedure by pre-allocating a Connection IDentifier (CID) to the plurality of the mobile stations at the target base station in a handover preparation procedure before a handover execution or action procedure, and for supporting the handover with reliability guaranteed by enabling a security related processing in a network re-entry procedure of the handover execution or action procedure.

To ease the understanding of the present invention, an IEEE 802.16j system is illustrated by way of example. Note that the present invention is applicable to every system in which the mobile relay station performs the handover in lieu of its subordinate mobile stations. In the IEEE 802.16j system, the base station can be referred to as a BS, the mobile relay station can be referred to as an MRS, and the mobile station can be referred to as an MS. When the present invention is applied to the Advanced standardization in a 3GPP LTE system, the base station can be called eNodeB, the mobile relay station can be called Mobile eNodeR, and the mobile station can be called UE.

Depending on an operation mode of the MRS, the handover of the MRS operating in a transparent mode according to one exemplary embodiment of the present invention and the handover of the MRS operating in a non-transparent mode according to another exemplary embodiment of the present invention shall be described. Herein, the transparent mode offers the relay service of the MRS without informing the MS of the existence of the MRS; that is, while making the MS recognize the data transmission and reception with the BS. To the contrary, the non-transparent mode offers the relay service of the MRS while informing the MS of the existence of the MRS.

Figure 1:
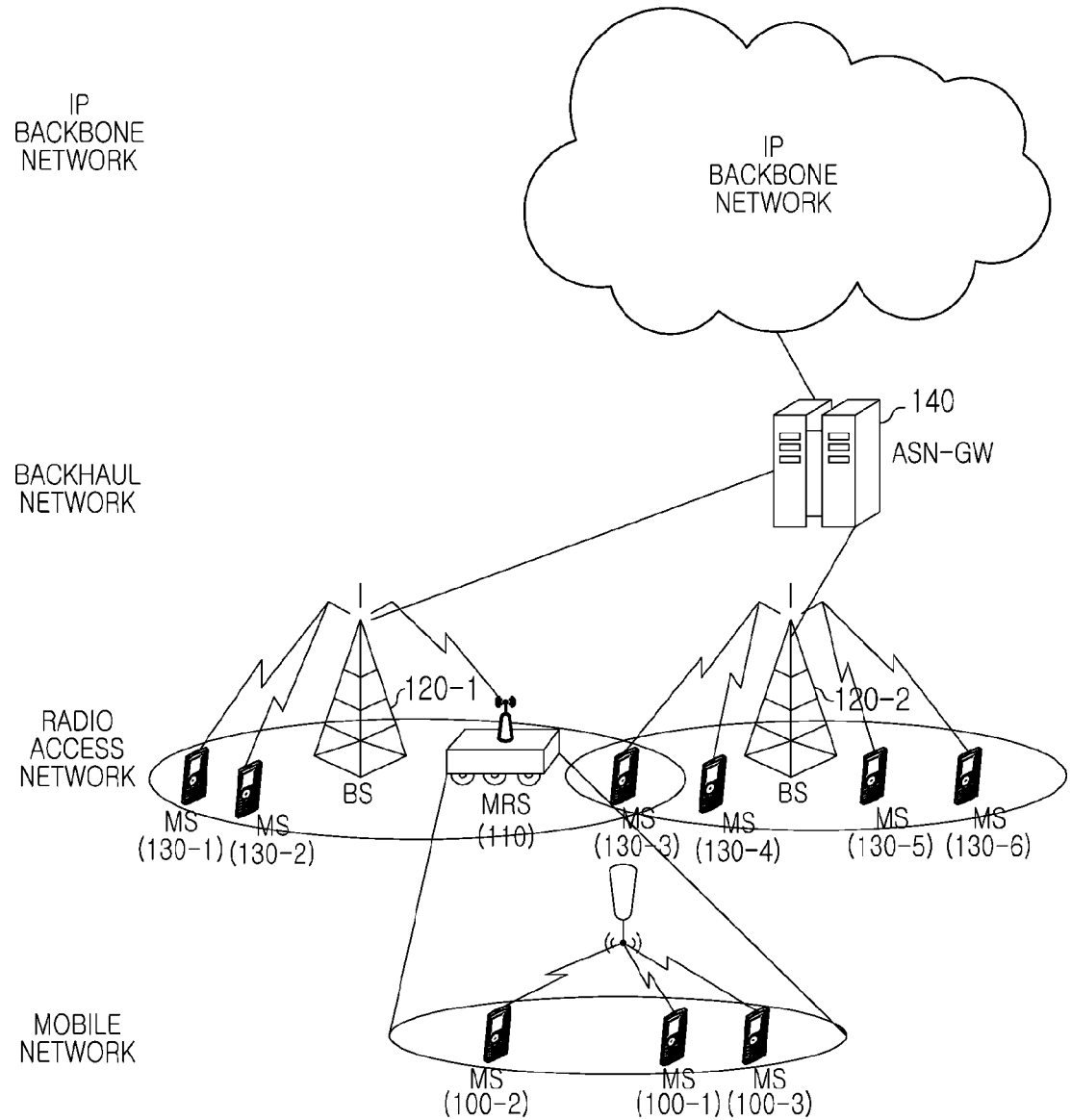
FIG. 1 is a diagram of a network configuration of a broadband wireless communication system according to an exemplary embodiment of the present invention.

FIG. 1 is a diagram of a network configuration of a broadband wireless communication system according to an exemplary embodiment of the present invention.

Referring to FIG. 1, BSs 120-1 and 120-2 provide radio connection to MSs 130-1 through 130-6 and 100-1 through 100-3 by interfacing through a radio access. An Access Service Network-Gateway (ASN-GW) 140 manages the connection and the mobility of the MSs 130-1 through 130-6 and 100-1 through 100-3. Herein, the MSs 130-1 through 130-6 belonging to a coverage of the BSs 120-1 and 120-2 are connected to the BSs 120-1 and 120-2 over direct links. The MSs 100-1 through 100-3 suffering poor channel condition from the BSs 120-1 and 120-2 according to their fast movement, for example, the MSs 100-1 through 100-3 of users riding a fast moving vehicle (e.g., bus or train) are connected to the BSs 120-1 and 120-2 in relay links via the MRS 110 installed to the moving vehicle. Hence, the BSs 120-1 and 120-2 can offer seamless and highly reliable services to the MSs 100-1 through 100-3.

Meanwhile, when the MRS 110 providing the communication with the BS 120-1 to the MSs 100-1 through 100-3 over the relay link in the service coverage of the BS 120-1, enters the service coverage of the BS 120-2 according to the movement of the moving vehicle, the MRS 110 performs the handover to the BS 120-2 in place of the MSs 100-1 through 100-3.

Herein, when the MRS performs the handover in lieu of its subordinate MSs, in a handover preparation procedure, the target BS 120-2 pre-allocates a CID to be used by the target BS 120-2 after the handover to the MSs 100-1 through 100-3 via the MRS 110 by exchanging backhaul messages with the serving BS 120-1 according to an exemplary embodiment of the present invention. In a handover execution or action procedure, the MRS 110 transmits uplink resource allocation information for requesting the bandwidth to the MSs 100-1 through 100-3 in the downlink interval of the same frame as the frame carrying a handover indication message to the serving BS 120-1. In doing so, the MSs 100-1 through 100-3 send a bandwidth request message including information required for the security authentication to the MRS 110 using the CID pre-allocated by the target BS 120-2. Herein, the bandwidth request message is transmitted before a network re-entry procedure of the target BS 120-2 and the MRS 110. Thus, the MRS 110 can simultaneously process the security authentication and the bandwidth request of the MSs 100-1 through 100-3 in the handover execution or action procedure. Alternatively, the target BS 120-2 may include the uplink resource allocation information for the bandwidth request of the MSs 100-1 through 100-3 to a ranging response message destined for the MRS 110 and send to the MSs 100-1 through 100-3 in response to a ranging code received from the MRS 110.

Figure 2:
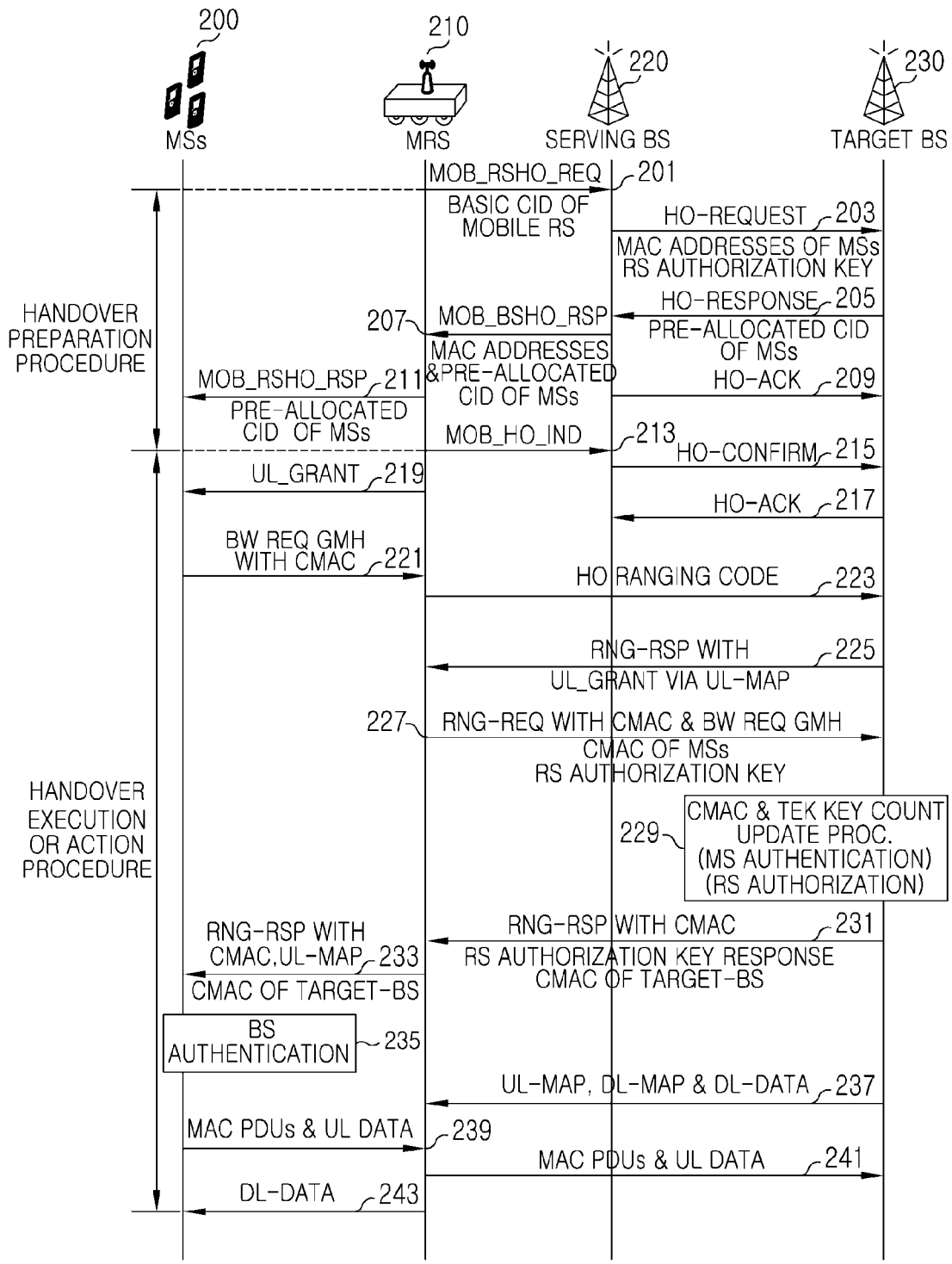
FIG. 2 is a signal flow diagram of a process for a mobile relay station of a non-transparent mode installed to a fast moving vehicle to perform handover in place of its subordinate mobile stations in the broadband wireless communication system according to one exemplary embodiment of the present invention.

FIG. 2 is a signal flow diagram of a process for the MRS of the non-transparent mode installed to the fast moving vehicle to perform the handover in place of its subordinate MSs in the broadband wireless communication system according to one exemplary embodiment of the present invention.

Referring to FIG. 2, in the handover preparation procedure, the MRS 210 determines whether the handover is required or not. Determining the necessity of the handover, the MRS 210 sends a handover request MOB_RSHO-REQ message to the serving BS 220 in step 201. The MOB_RSHO-REQ message includes a basic CID of the MRS 210. Herein, whether the handover is required or not can be determined by comparing a signal strength of the serving BS 220 with a reference value. For example, when the signal strength of the serving BS 220 is less than the reference value, the necessity of the handover can be determined.

Next, according to the reception of the MOB_RSHO-REQ message, the serving BS 220 sends a handover request HO-Request message for requesting the handover of the corresponding MRS 210, to the target BS 230 in step 203. Herein, the serving BS 220 manages MAC addresses of the MSs 200 serviced by the corresponding MRS 210 per MRS, and an authorization key of the MRS 210. When receiving the MOB_RSHO-REQ message, the serving BS 220 retrieves the MAC addresses of the MSs 200 serviced by the corresponding MRS 210 using the basic CID of the MRS 210 contained in the MOB_RSHO-REQ message, and the authentication key of the MRS 210, and sends the HO-Request message to the target BS 230 by including the basic CID of the MRS 210 and the retrieved information to the HO-Request message. Herein, the HO-Request message, which is a backhaul message, is delivered to the target BS 230 via the ASN-GW.

Next, according to the reception of the HO-Request message, the target BS 230 pre-allocates a new CID to be used at the target BS 230 after the handover, to the MRS 210 and the MSs 200 serviced by the MRS 210. In step 205, the target BS 230 sends a handover response HO-Response message including the CID pre-allocated to the MRS 210 and the MSs 200, to the serving BS 220. Herein the HO-Response message, which is a backhaul message as well, is delivered to the serving BS 220 via the ASN-GW.

In step 207, according to the reception of the HO-Response message, the serving BS 220 sends a handover response MOB_BSHO-RSP message including the MAC addresses of the MSs 200 and the CID pre-allocated to the MRS 210 and the MSs 200, to the MRS 210.

Upon the reception of the MOB_BSHO-RSP message, the MRS 210 sends a handover response MOB_RSHO-RSP message including the CID pre-allocated to its servicing MSs 200 using the MAC addresses of the MSs 200 in step 211. Thus, the handover preparation procedure is finished.

Next, as for the handover execution or action procedure, the MRS 210 sends a handover indication MOB_HO-IND message for informing of the communication end with the serving BS 220, to the serving BS 220 in step 213. Hence, the communication with the serving BS 220 is terminated.

Upon receiving the MOB_HO-IND message, the serving BS 220 sends a handover confirmation HO-Confirm message for informing of the handover of the MRS 210, to the target BS 230 in step 215. In response to the HO-Confirm message, the target BS 230 can send a handover Ack HO-Ack message to the serving BS 220 in step 217. Thus, the MRS 210 finishes frequency synchronization and time synchronization of the downlink with the target BS 230.

Meanwhile, the MRS 210 sends a UL_Grant message informing of the start of the handover execution or action procedure to the MSs 200 in the downlink interval of the same frame as the frame carrying the MOB_HO-IND message in step 219. In doing so, the UL_Grant message includes the uplink resource allocation information for the subsequent transmission of the security authentication information (e.g., Cipher-based Message Authentication Code (CMAC)) and the bandwidth request. For example, when the amount of the resource required for delivering the CMAC is 64 bits, the MRS 210, which already knows the number of its subordinate MSs 200, can allocate the resource as much as the number of the MSs* the resource (64 bits) required for the CMAC transmission, to the uplink interval.

In step 221, the MSs 200 send a bandwidth request BW REQ Generic MAC Header (GMH) with CMAC message including the information CMAC required for its security authentication to the MRS 210 using the CID pre-allocated by the target BS 230.

Figure 5:
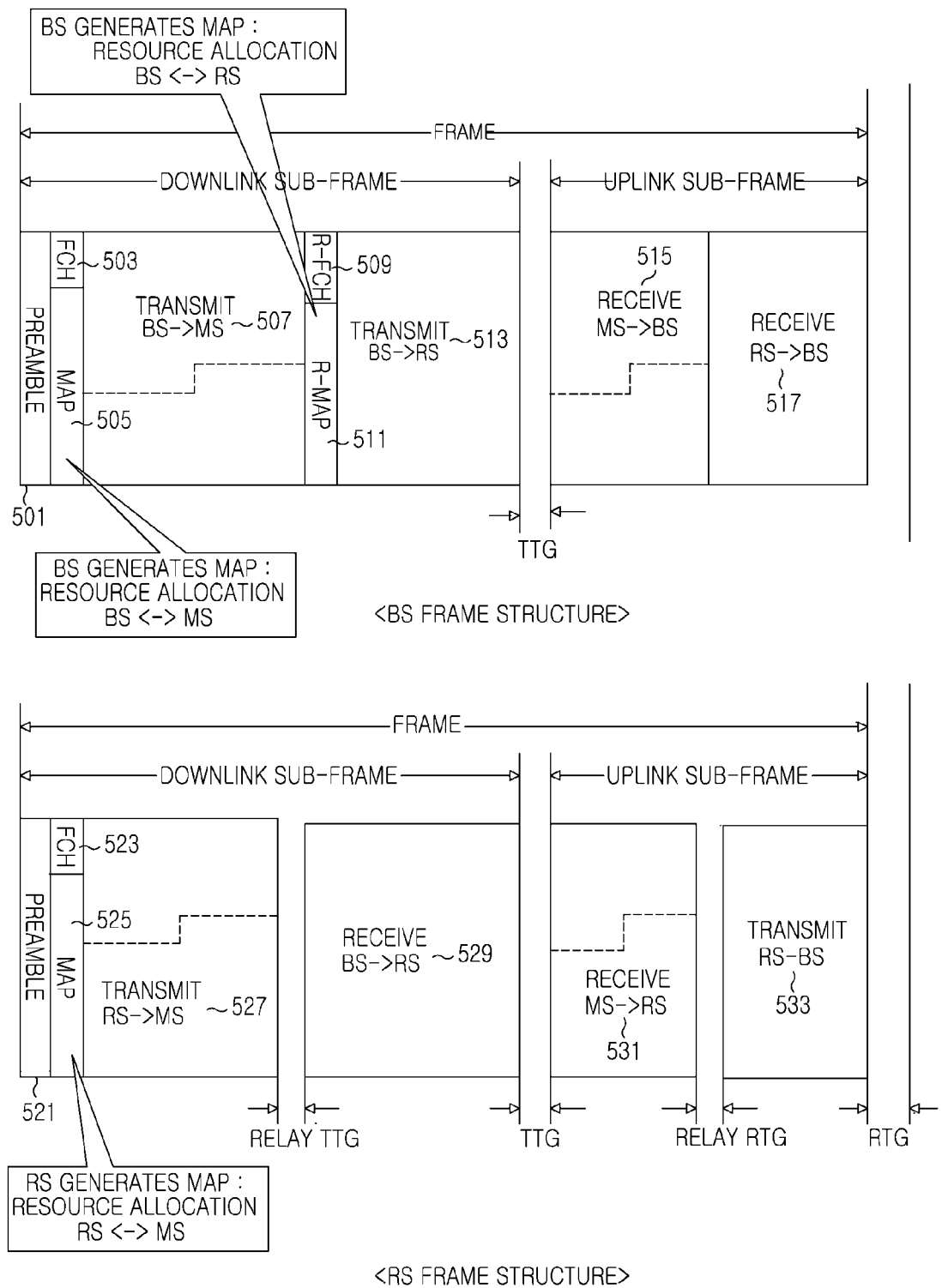
FIG. 5 is a diagram of frame structures of the base station and the mobile relay station in the broadband wireless communication system which offers a relay service of the mobile relay station to the mobile station in the non-transparent mode according to one exemplary embodiment of the present invention.

As for the frame structures of the BS and the MRS operating in the non-transparent mode in FIG. 5, the resource allocation between the BS and the MSs connected to the BS in the direct links, the resource allocation between the BS and the MRS, the resource allocation between the MSs connected to the BS in the relay links via the MRS and the MRS, and the transmission of the resource allocation information are conducted in different time intervals within the frame or carried out by the different subjects. Accordingly, even when the communication between the serving BS 220 and the MRS 210 ends according to the transmission of the MOB_HO-IND message, this merely affects the resource allocation between the serving BS 220 and the MRS 210 but does not affect the resource allocation between the MRS 210 and the MSs 200. In other words, even when the communication with the serving BS 220 finishes, the MRS 210 itself is able to allocate the resources to the MSs 200 regardless of the communication end and transmit resource allocation information MAP. That is, the MRS 210 can transmit the uplink resource allocation information for the transmission of the security authentication information and the bandwidth request of the MSs. The frame structures of FIG. 5 shall be explained in more detail.

In step 223, the MRS 210 sends a ranging code HO Ranging code message including a contention based ranging code to the target BS 230. In step 225, the target BS 230 sends a ranging response RNG-RSP with UL_Grant via UL-MAP message including the uplink resource allocation information UL-MAP for sending the subsequent ranging request message and synchronization acquisition information (e.g., Phy Ranging) for the successful execution of the network re-entry, to the MRS 210. Thus, the MRS 210 finishes the time synchronization of the uplink with the target BS 230.

By aggregating the bandwidth request messages including the security authentication information received from the MSs 200 in the uplink interval of the same frame as the frame carrying the contention based ranging code, the MRS 210 sends a ranging request RNG-REQ with CMAC & BW ERQ GMH message including information required for the security authentication and the bandwidth request information of the MSs 200, the authorization key of the MRS 210, and REG-Tag, Length, Value (TLV) information required for the registration of the MRS 210, to the target BS 230 to thus attempt the network re-entry in step 227. At this time, the CID is the new CID pre-allocated by the target BS 230.

In step 229, the target BS 230 completes the registration and the authorization using the REG-TLV information and the authorization key of the MRS 210 via the ASN-GW. Also, the target BS 230 performs the security authentication of the MSs 200 using the security authentication information CMAC. In doing so, the CMAC and the count of the Traffic Encryption Key (TEK) key can be updated.

In step 231, the target BS 230 sends a ranging response RNG-RSP with CMAC message including the response informing of the completion of the authorization procedure for the MRS 210 and the information CMAC required for the security authentication of the target BS 230 to the MRS 210.

In step 233, the MRS 210 sends a ranging response RNG-RSP with CMAC message including the information CMAC required for the security authentication of the target BS 230 and the uplink resource allocation information UL-MAP for sending the data of the corresponding MSs 200, to the MSs 200. The MSs 200 performs the security authentication to determine whether the security authentication information CMAC of the target BS 230 is valid or not in step 235. Hence, the network re-entry procedure is finished.

Meanwhile, after sending the RNG-RSP with CMAC message in step 231, the target BS 230 allocates the uplink resource and the downlink resource for the communication with the MRS 210 according to the bandwidth request, and transmits the uplink resource allocation information UL-MAP, the downlink resource allocation information DL-MAP, and the downlink data DL-data to the MRS 210 in step 237. The MSs 200 transmit uplink data MAC PDUs & UL Data to the MRS 210 in step 239 using the uplink resource allocated through the UL-MAP in step 233.

Next, the MRS 210 forwards the MAC PDUs & UL Data received from the MSs 200 in step 239 to the target BS 230 in step 241, and forwards the DL-Data received in step 237 to the MSs 200 in step 243. Thus, the connection set-up procedure is finished.

Figure 3:
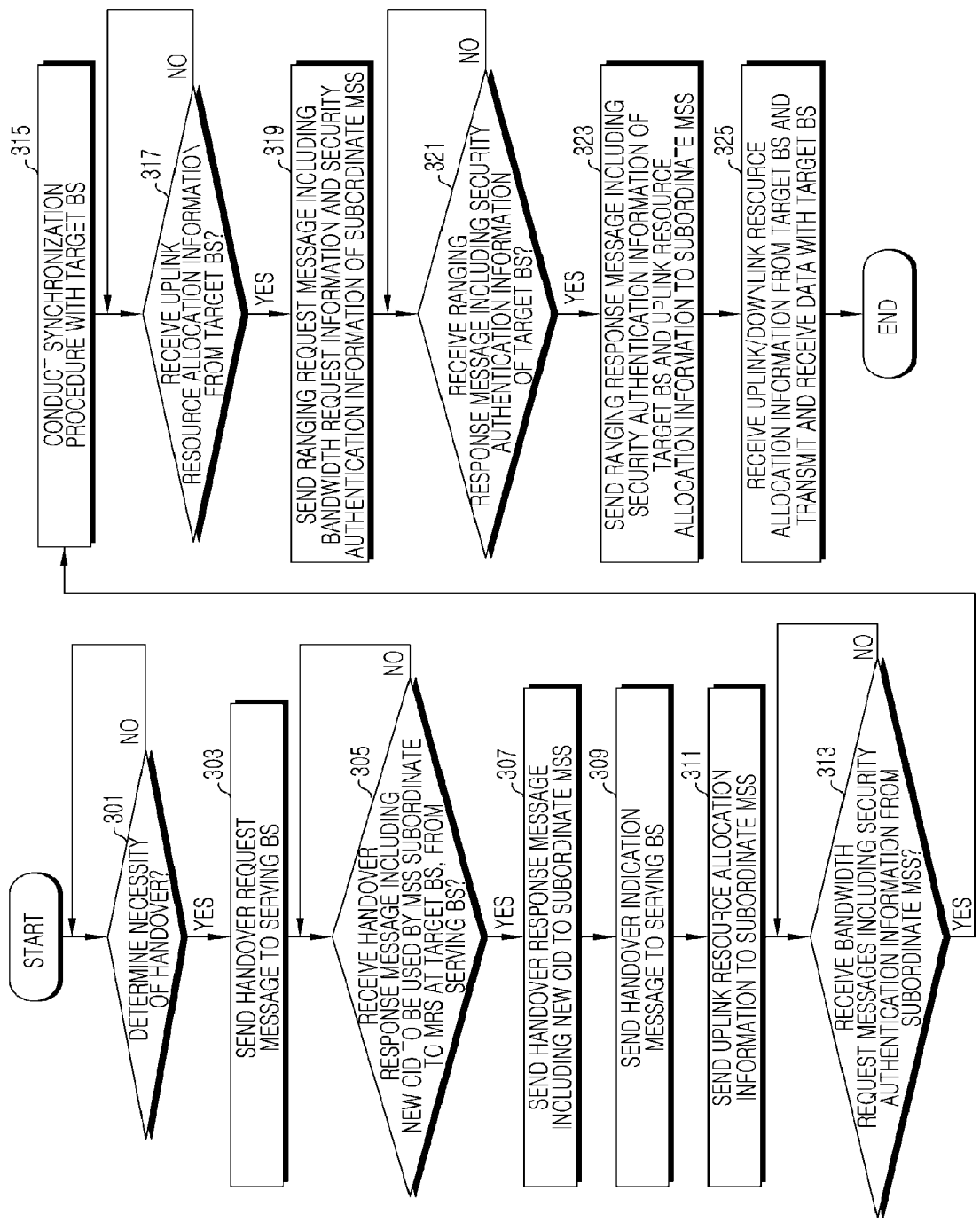
FIG. 3 is a flowchart of a method for the mobile relay station of the non-transparent mode installed to the fast moving vehicle to perform the handover in place of its subordinate mobile stations in the broadband wireless communication system according to one exemplary embodiment of the present invention.

FIG. 3 is a flowchart of a method for the MRS of the non-transparent mode installed to the fast moving vehicle to perform the handover in place of its subordinate MSs in the broadband wireless communication system according to one exemplary embodiment of the present invention.

Referring to FIG. 3, the MRS determines whether the handover is required or not in step 301. When determining the necessity of the handover, the MRS sends the handover request MOB_RSHO-REQ message to the serving BS in step 303. The MOB_RSHO-REQ message includes the basic CID of the MRS.

In step 305, the MRS determines whether the handover response MOB_BSHO-RSP message including the MAC addresses of the MSs serviced by the MRS and the new CID pre-allocated by the target BS to be used by the MRS and the MSs after the handover at the target BS, is received from the serving BS. When receiving the MOB_BSHO-RSP message, the MRS sends the handover response MOB_RSHO-RSP message including the CID pre-allocated to it servicing MSs to the MSs using the MAC addresses of the MSs in step 307. Hence, the handover preparation procedure is completed.

In step 309, the MRS sends the handover indication MOB_HO-IND message informing of the end of the communication with the serving BS, to the serving BS. Thus, the communication between the MRS and the serving BS is terminated.

In step 311, the MRS sends the UL_Grant message informing the MSs of the start of the handover execution or action procedure to the MSs in the downlink interval of the same frame as the frame carrying the MOB_HO-IND message to the serving BS. The UL_Grant message includes the uplink resource allocation information for the security authentication information transmission and the bandwidth request of the MSs.

In step 313, the MRS determines whether the bandwidth request BW REQ GMH with CMAC message including the information CMAC required for the security authentication of the MSs is received from the MSs. When receiving the bandwidth request message, the MRS conducts the synchronization procedure with the target BS by sending the HO Ranging code message including the contention based ranging code to the target BS in step 315.

In step 317, the MRS determines whether the ranging response RNG-RSP with UL_Grant via UL-MAP message including the uplink resource allocation information UL-MAP for carrying the subsequent ranging request message and the synchronization acquisition information (e.g., Phy Ranging) for the success of the network re-entry is received from the target BS.

When receiving the RNG-RSP with UL_Grant via UL-MAP message, the MRS aggregates the bandwidth request messages including the security authentication information received from the MSs in the uplink interval of the same frame as the frame carrying the contention based ranging code, and attempts the network re-entry by sending the ranging request RNG-REQ with CMAC & BW REQ GMH message including the information required for the security authentication and the bandwidth request information of the MSs, the authorization key of the MRS, and the REG-TLV information required for the registration of the MRS, to the target BS in step 319.

In step 321, the MRS determines whether the ranging response RNG-RSP with CMAC message including the response informing of the completion of the authorization of the MRS and the information CMAC required for the security authentication of the target BS is received from the target BS.

When receiving the RNG-RSP with CMAC message, the MRS sends the ranging response RNG-RSP with CMAC message including the information CMAC required for the security authentication of the target BS and the allocation information UL-MAP of the uplink resource for delivering the data of the corresponding MSs to the MSs in step 323. Thus, the network re-entry procedure is finished.

In step 325, the MRS receives the uplink resource allocation information UL-MAP and the downlink resource allocation information DL-MAP from the target BS, and transmits and receives data to and from the target BS according to the UL-MAP and the DL-MAP. Also, the MRS transmits and receives to and from the MSs.

Next, the MRS finishes the algorithm of the present invention.

Figure 4:
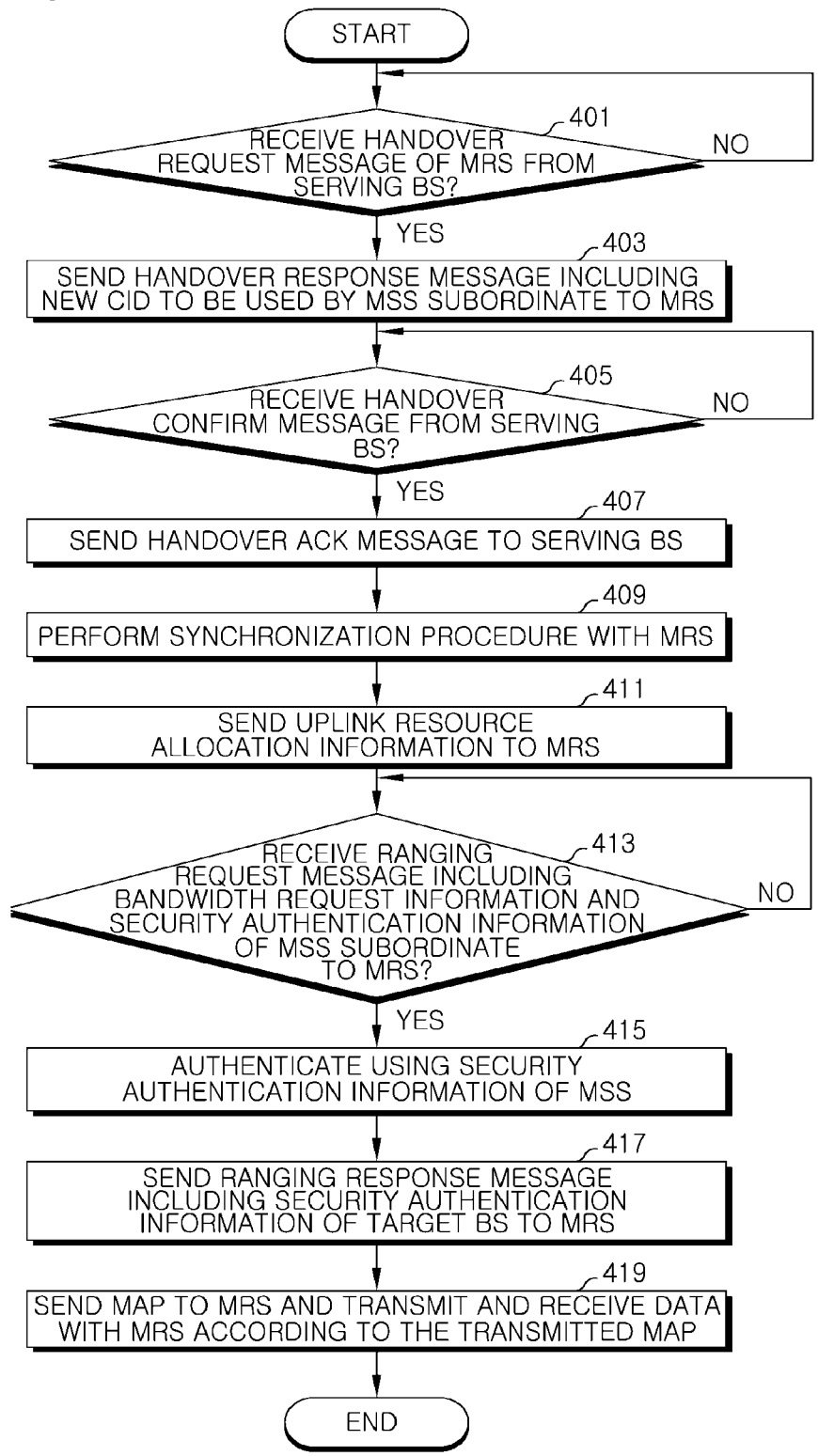
FIG. 4 is a flowchart of operations of a target base station when the mobile relay station of the non-transparent mode installed to the fast moving vehicle performs the handover in place of its subordinate mobile stations in the broadband wireless communication system according to one exemplary embodiment of the present invention.

FIG. 4 is a flowchart of operations of the target BS when the MRS of the non-transparent mode installed to the fast moving vehicle performs handover in place of its subordinate MSs in the broadband wireless communication system according to one exemplary embodiment of the present invention.

Referring to FIG. 4, the target BS determines whether the handover request HO-Request message for requesting the handover of the MRS is received from the serving BS or not in step 401. Herein, the HO-Request message includes the basic CID of the MRS, the MAC addresses of the MSs serviced by the MSR, and the authorization key of the MRS.

Upon receiving the HO-Request message, the target BS pre-allocates the new CID to be used at the target BS after the handover to the MRS and the MSs serviced by the MRS, and sends the handover response HO-Response message including the CID pre-allocated to the MRS and the MSs to the serving BS in step 403.

In step 405, the target BS determines whether the handover confirmation HO-Confirm message for informing of the handover of the MRS is received from the serving BS. Upon receiving the HO-Confirm message, the target BS sends the handover Ack HO-Ack message to the serving BS in step 407.

In step 409, the target BS conducts the synchronization procedure with the MRS by receiving the ranging code HO Ranging code message including the contention based ranging code from the MRS.

In step 411, the target BS sends the ranging response RNG-RSP with UL_Grant via UL-MAP message including the uplink resource allocation information UL-MAP for the transmission of the subsequent ranging request message and the synchronization acquisition information (e.g., Phy Ranging) for the success of the network re-entry, to the MRS.

In step 413, the target BS determines whether the ranging request RNG-REQ with CMAC & BW REQ GMH message including the information required for the security authentication and the bandwidth request information of the MSs serviced by the MRS, the authorization key of the MRS, and the REG-TLV information required for the registration of the MRS, is received from the MRS. When receiving the RNG-REQ with CMAC & BW REQ GMH message, the target BS carries out the registration and the authorization via the ASN-GW using the REG-TLV information and the authorization key of the MRS, and performs the security authentication procedure using the security authentication information CMAC of the MSs in step 415.

In step 417, the target BS sends the ranging response RNG-RSP with CMAC message including the response informing of the completion of the authorization procedure of the MRS and the information CMAC required for the security authentication of the target BS, to the MRS.

In step 419, the target BS allocates the uplink resource and the downlink resource for the communication with the MRS 210 according to the bandwidth request, sends the uplink resource allocation information UL-MAP and the downlink resource allocation information DL-MAP to the MRS, and transmits and receives data to and from the MRS according to the UL-MAP and the DL-MAP.

Next, the target BS finishes the algorithm of the present invention.

FIG. 5 is a diagram of frame structures of the BS and the MRS in the broadband wireless communication system which offers the relay service of the MRS to the MS in the non-transparent mode according to one exemplary embodiment of the present invention.

The frame structure of the BS in FIG. 5 includes one downlink sub-frame and one uplink sub-frame. Herein, the downlink sub-frame carries data from the BS to the MSs connected to the BS through the direct links or the MRS, and the uplink sub-frame carries data from the several MSs connected to the BS through the direct links or the MRS to the BS over a set region.

Herein, the downlink sub-frame includes a preamble 501, a Frame Control Header (FCH) 503 for the communication between the BS and the MSs connected through the direct links, MAP 505, downlink data bursts 507, R-FCH 509 for the communication between the BS and the MRS, R-MAP 511, and downlink data bursts 513. Herein, the preamble 501 is used for the initial synchronization acquisition and the cell scan of the MS and the MRS. The FCH 503 and the R-FCH 509 include information describing the basic construction of the frame. Herein, the MAP 505 is the resource allocation information between the BS and the MSs connected to the BS through the direct links, the R-MAP 511 is the resource allocation information between the BS and the MRS, and the MAP 505 and the R-MAP 511 are generated by the BS. The MAP 505 includes DL-MAP including information informing of the region 507 of the downlink data bursts, and UL-MAP including information of the structure of an uplink frame 515. The R-MAP 511 includes DL-MAP including information informing of the region 513 of the downlink data bursts, and UL-MAP including information informing of the structure of an uplink frame 517. The uplink sub-frame includes the uplink data bursts 515 transmitted and received between the BS and the MSs connected to the BS through the direct links, and the uplink data bursts 517 transmitted and received between the BS and the MRS.

Next, the frame structure of the MRS includes one downlink sub-frame and one uplink sub-frame. Herein, the downlink sub-frame is used for the MRS to transmit data to the MSs connected to the BS through the relay links via the MRS, or to receive data from the BS. The uplink sub-frame is used for the MRS to receive data from the MSs connected to the BS through the relay links via the MRS, or to transmit data to the BS.

Herein, the downlink sub-frame includes a preamble 521, a FCH 523 for the communication between the MRS and the MSs connected to the BS through the relay links via the MRS, MAP 525, downlink data bursts 527, and downlink data bursts 529 for the communication between the BS and the MRS. The preamble 521 is used for the initial synchronization acquisition and the cell scan of the MS connected to the BS through the relay link as well. The FCH 523 includes information describing the basic construction of the frame. The MAP 525 is the resource allocation information between the MRS and the MSs connected to the BS through the relay link via the MRS, and is generated by the MRS. The MAP 525 includes DL-MAP including information informing of the region 527 of the downlink data bursts, and UL-MAP including information informing of the structure of the uplink frame 531. The uplink sub-frame includes uplink data bursts 531 transmitted and received between the MRS and the MSs connected to the BS through the relay links via the MRS, and uplink data bursts 533 transmitted and received between the BS and the MRS.

Figure 6:
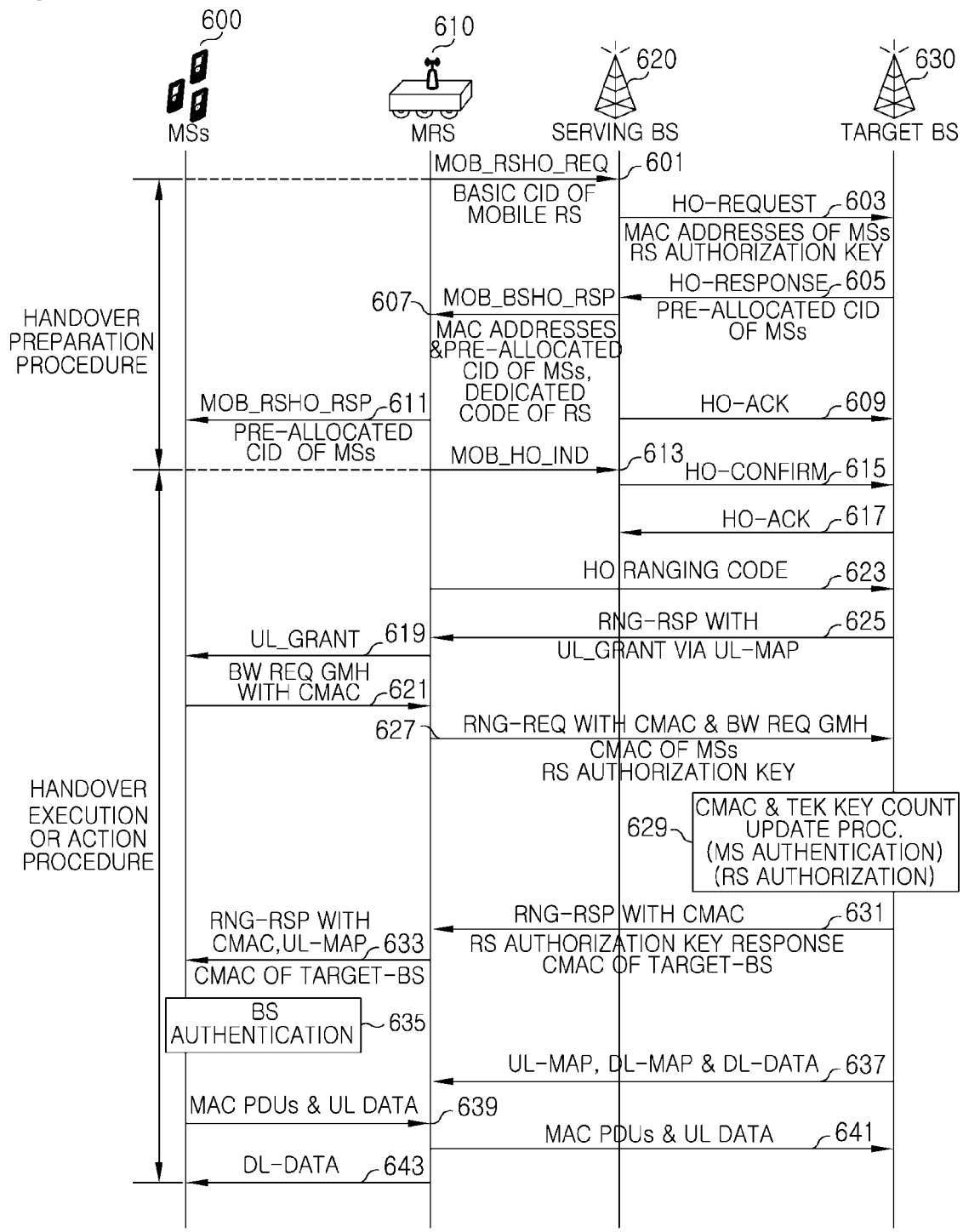
FIG. 6 is a signal flow diagram of a process for a mobile relay station of a transparent mode installed to a fast moving vehicle to perform handover in place of its subordinate mobile stations in the broadband wireless communication system according to another exemplary embodiment of the present invention.

FIG. 6 is a signal flow diagram of a process for the MRS of the transparent mode installed to the fast moving vehicle to perform the handover in place of its subordinate MSs in the broadband wireless communication system according to another exemplary embodiment of the present invention.

The process of FIG. 6 is the same as the process of FIG. 2 on the whole, but the steps 219 and 221 of FIG. 2 interpose between the step 225 and the step 227.

As for frame structures of the BS and the MRS operating in the transparent mode in FIG. 7, the resource allocation between the BS and the MSs connected to the BS through the direct links, the resource allocation between the BS and the MRS, the resource allocation between the MSs connected to the BS through the relay links via the MRS and the MRS, and the transmission of the resource allocation information are conducted in one time interval within the BS frame. The subject of the resource allocation is the BS. Accordingly, in the transparent mode, the communication end between the serving BS and the MRS according to the MOB_HO-IND message sent from the MRS to the serving BS as in step 213 of FIG. 2 affects not only the resource allocation between the serving BS and the MRS but also the resource allocation between the MRS and the MSs connected through the relay links. That is, since the serving BS performs every resource allocation, when the communication with the serving BS ends, the MSs connected through the relay links cannot be assigned the uplink resources for the transmission of the security authentication information and the bandwidth request as in step 219 of FIG. 2. As a result, the MSs cannot send the bandwidth request BW REQ Generic MAC Header (GMH) with CMAC message including the information CMAC required for its security authentication to the MRS in step 221 of FIG. 2.

In step 225 of FIG. 2, the MRS receives the ranging response RNG-RSP with UL_Grant via UL-MAP message including the uplink resource allocation information UL-MAP for sending the subsequent ranging request message and the synchronization acquisition information (e.g., Phy Ranging) for the success of the network re-entry, from the target BS. In doing so, when the MSs connected through the relay links are assigned the uplink resources for the security authentication information delivery and the bandwidth request together using the RNG-RSP with UL_Grant via UL-MAP message, the MSs connected by the relay links can send the bandwidth request BW REQ Generic MAC Header (GMH) with CMAC message including the information CMAC required for its security authentication to the MRS. Accordingly, in the transparent mode, the steps 619 and 621 corresponding to the steps 219 and 221 of FIG. 2 can interpose between the steps 625 and 627 corresponding to the steps 225 and 227 of FIG. 2. The uplink resource allocation information contained in the RNG-RSP with UL_Grant via UL-MAP message of step 625 includes the information of the uplink resource allocation between the MSs connected to the BS by the relay links via the MRS and the MRS, as well as the uplink resource allocation between the BS and the MRS.

Herein, for the target BS to include the resource allocation information between the MSs connected by the relay links and the MRS to the RNG-RSP with UL_Grant via UL-MAP message in step 625, the serving BS allocates a dedicated code to the MRS in the exemplary embodiment of the present invention. In other words, the handover response MOB_BSHO-RSP message received at the MRS from the serving BS in step 607 corresponding to the step 207 of FIG. 2 can contain the dedicated code of the MRS in addition to the MAC addresses of the MSs serviced by the MRS and the CID pre-allocated to the MRS and the MSs. At this time, the MRS can send the ranging code to the target BS using the dedicated code in step 623 corresponding to the step 223 of FIG. 2, and the target BS can allocate the resources between the MSs connected by the relay links and the MRS using the dedicated code. For example, when the amount of the resource required to deliver the CMAC is 64 bits and the agreed dedicated code is received, the target BS, which already knows the number of the MSs subordinate to the MRS through the handover preparation procedure, can allocate the resource as much as the number of the MSs* the amount (64 bits) of the necessary resource for the CMAC transmission, to the uplink interval.

FIG. 7 is a diagram of frame structures of the BS and the MRS in the broadband wireless communication system which offers a relay service of the MRS to the MS in the transparent mode according to another exemplary embodiment of the present invention.

Similar to FIG. 5, the BS frame structure of FIG. 7 includes one downlink sub-frame and one uplink sub-frame. Herein, the downlink sub-frame carries data from the BS to the MSs connected to the BS through the direct links or the MRS, and the uplink sub-frame carries data from the several MSs connected to the BS through the direct links or the MRS to the BS over a set region.

Herein, the downlink sub-frame includes a preamble 701, FCH 703 and MAP 705 for the communication between the BS and the MSs connected to the BS by the direct links, the communication between the BS and the MRS, and the communication between the MRS and the MSs connected to the MRS by the relay links, downlink data bursts 707 transmitted and received between the BS and the MSs connected to the BS through the direct links, and downlink data bursts 709 transmitted and received between the BS and the MRS. Herein, the MAP 705 includes the information relating to all of the resource allocation between the BS and the MSs connected to the BS by the direct links, the resource allocation between the BS and the MRS, and the resource allocation between the MRS and the MSs connected to the MRS by the relay links. The MAP 705 is generated by the BS. The uplink sub-frame includes uplink data bursts 713 transmitted and received between the BS and the MSs connected to the BS by the direct links, and uplink data bursts 717 transmitted and received between the BS and the MRS. Herein, the downlink sub-frame and the uplink sub-frame of the BS include silent intervals 711 and 715 carrying no data. The silent intervals 711 and 715 correspond to the same time and frequency interval as the interval where the MRS communicates with the MSs connected by the relay links in the frame of the MRS.

Next, the frame structure of the MRS also includes one downlink sub-frame and one uplink sub-frame. Herein, the downlink sub-frame is used for the MRS to transmit data to the MSs connected to the BS through the relay links via the MRS, or to receive data from the BS. The uplink sub-frame is used for the MRS to receive data from the MSs connected to the BS through the relay links via the MRS, or to transmit data to the BS.

Herein, the downlink sub-frame includes downlink data bursts 723 for the communication between the BS and the MRS, and downlink data bursts 725 for the communication between the MRS and the MSs connected to the BS through the relay links via the MRS. The uplink sub-frame includes uplink data bursts 729 transmitted and received between the MRS and the MSs connected to the BS through the relay links via the MRS, and uplink data bursts 731 transmitted and received between the BS and the MRS. Herein, the downlink sub-frame and the uplink sub-frame of the MRS include silent intervals 721 and 727 carrying no data. The silent intervals 721 and 727 correspond to the same time and frequency interval as the interval where the BS communicates with the MSs connected by the direct links in the frame of the BS.

As set forth above, when the MRS installed to the fast moving vehicle conducts the handover in lieu of its subordinate MSs in the broadband wireless communication system, the MRS provides the MSs with the CID pre-allocated by the target BS to be used at the target BS after the handover in the handover preparation procedure, and the MSs transmit the information relating to the final bandwidth requested to the target BS to the MRS together with the security authentication information using the pre-allocated CID in the handover execution or action procedure. Therefore, the handover delay time, which is inevitable for the bandwidth request in the conventional connection set-up procedure, can be reduced, and the handover with the reliability guaranteed can be carried out by allowing the security related processing in the network re-entry procedure. That is, it is possible to design the handover procedure compatible with the security legacy policy of the Mobile Wimax. Further, by pre-allocating the CID in the handover preparation procedure, the MRS does not have to perform the CID mapping in the handover execution or action procedure, compared to the conventional scheme.

While the invention has been shown and described with reference to certain exemplary embodiments thereof, it will be understood by those skilled in the art that various changes in form and details may be made therein without departing from the spirit and scope of the invention as defined by the appended claims and their equivalents.

The invention claimed is:

1. A method for performing handover at a Mobile Relay Station (MRS) in place of Mobile Stations (MSs) in a wireless communication system, the method comprising:
    transmitting Connection IDs (CIDs) of the MSs, the CIDs pre-allocated by a target Base Station (BS), to the MSs;
    sending a resource allocation message comprising uplink resource allocation information for bandwidth request of the MSs, to the MSs;
    receiving a bandwidth request message which comprises security authentication information of each MS, from the MSs using an uplink resource allocated through the uplink resource allocation information; and
    aggregating bandwidth request messages of the MSs and sending a ranging request message comprising the security authentication information and bandwidth request information of the MSs to the target BS,
    wherein transmitting the CIDs of the MSs comprises:
        sending the handover request message to the serving BS;
        receiving a handover response message from the serving BS, the handover response message comprising the CIDs of the MSs pre-allocated by the target BS; and
        sending the handover response message comprising the pre-allocated CIDs to the MSs,
    wherein the CIDs are generated by the target BS, in response to a handover request message from a serving BS,
    wherein the bandwidth request message is generated by the MSs, using the CIDs, and
    wherein the ranging request message is generated by the MRS, using the CIDs.

2. The method of claim 1, further comprising, before sending the resource allocation message to the MSs:
    sending a handover indication message to the serving BS;
    sending a HO ranging code message comprising a ranging code to the target BS; and
    receiving a ranging response message comprising uplink resource allocation information for transmitting the ranging request message, from the target BS.

3. The method of claim 2, wherein the handover indication message is transmitted to the serving BS in an uplink subframe of a frame carrying the resource allocation message to the MSs.

4. The method of claim 2, wherein the ranging response message comprises uplink resource allocation information for the bandwidth request of the MSs.

5. The method of claim 4, further comprising:
    acquiring a dedicated ranging code of the MRS from the handover response message received from the serving BS, wherein the ranging code is a dedicated ranging code of the MRS.

6. An operating method of a Mobile Station (MS) when a Mobile Relay Station (MRS) performs handover in place of the MS in a wireless communication system, the method comprising:
    receiving a handover response message comprising a Connection IDentifier (CID) of the MS pre-allocated by a target Base Station (BS), from the MRS;
    receiving a resource allocation message comprising uplink resource allocation information for bandwidth request of the MS, from the MRS; and
    generating and sending a bandwidth request message comprising security authentication information of the MS to the MRS using an uplink resource allocated through the uplink resource allocation information,
    wherein the CID is generated by the target BS, in response to a handover request message from a serving BS, and
    wherein the bandwidth request message is generated by the MS, using the CID.

7. The operating method of claim 6, further comprising:
    receiving a ranging response message comprising security authentication information of the target BS, from the MRS; and
    authenticating the target BS using the security authentication information of the target BS.

8. A method for a target Base Station (BS) to support handover when a Mobile Relay Station (MRS) performs the handover in place of Mobile Stations (MSs) in a wireless communication system, the method comprising:
    pre-allocating a Connection ID (CID) to the MSs when a handover request message is received from a serving BS of the MRS;
    sending a handover response message comprising the pre-allocated CID of the MSs to the serving BS;
    receiving a HO ranging code message comprising a ranging code from the MRS;
    sending a ranging response message comprising uplink resource allocation information for transmitting a subsequent ranging request message, to the MRS; and
    receiving a ranging request message comprising security authentication information and bandwidth request information of the MSs, from the MRS,
    wherein the ranging request message is generated by the MRS, using the CID.

9. The method of claim 8, wherein the ranging response message comprises the uplink resource allocation information for the bandwidth request of the MSs.

10. An apparatus for supporting handover when a Mobile Relay Station (MRS) performs handover in place of Mobile Stations (MSs) in a wireless communication system, the apparatus comprising:
    the MRS for transmitting Connection IDs (CIDs) of the MSs, the CIDs pre-allocated by a target BS, to the MSs, sending a resource allocation message comprising uplink resource allocation information for bandwidth request of the MSs, to the MSs, when receiving a bandwidth request message which comprises security authentication information of each MS, from the MSs, aggregating bandwidth request messages of the MSs, and sending a ranging request message comprising the security authentication information and bandwidth request information of the MSs to the target BS; and the MS for receiving a handover response message comprising the CIDs of the MS pre-allocated by the target BS, from the MRS, when receiving a resource allocation message comprising uplink resource allocation information for bandwidth request of the MS, and sending a bandwidth request message comprising security authentication information of the MS to the MRS using an uplink resource allocated through the uplink resource allocation information, wherein the MRS sends the handover request message to the serving BS, receives a handover response message from the serving BS, the handover response message comprising the CIDs of the MSs pre-allocated by the target BS, and sends the handover response message comprising the pre-allocated CIDs to the MSs, wherein the CIDs are generated by the target BS, in response to a handover request message from a serving BS, wherein the bandwidth request message is generated by the MSs, using the CIDs, and wherein the ranging request message is generated by the MRS, using the CIDs.

11. The apparatus of claim 10, wherein the MRS, before sending the resource allocation message to the MSs, sends a handover indication message to the serving BS, and sends a HO ranging code message comprising a ranging code to the target BS, and receives a ranging response message comprising uplink resource allocation information for transmitting the ranging request message, from the target BS.

12. The apparatus of claim 11, wherein the handover indication message is transmitted to the serving BS in an uplink sub-frame of a frame carrying the resource allocation message to the MSs.

13. The apparatus of claim 11, wherein the MRS acquires a dedicated ranging code of the MRS from the handover response message received from the serving BS, the ranging code is a dedicated ranging code of the MRS, and the ranging response message comprises uplink resource allocation information for the bandwidth request of the MSs.

* * * * *